US011048796B2

(12) United States Patent
Kraus et al.

(10) Patent No.: US 11,048,796 B2
(45) Date of Patent: Jun. 29, 2021

(54) SECURELY PERFORMING PARAMETER DATA UPDATES

(71) Applicant: Siemens Healthcare GmbH, Erlangen (DE)

(72) Inventors: Martin Kraus, Fuerth (DE); Andre Aichert, Erlangen (DE)

(73) Assignee: SIEMENS HEALTHCARE GMBH, Erlangen (DE)

( * ) Notice: Subject to any disclaimer, the term of this patent is extended or adjusted under 35 U.S.C. 154(b) by 0 days.

(21) Appl. No.: 16/924,305

(22) Filed: Jul. 9, 2020

(65) Prior Publication Data

US 2021/0019395 A1 Jan. 21, 2021

(30) Foreign Application Priority Data

Jul. 19, 2019 (EP) ..................................... 19187209

(51) Int. Cl.
*G06F 21/53* (2013.01)
*G06F 9/455* (2018.01)
(Continued)

(52) U.S. Cl.
CPC .............. *G06F 21/53* (2013.01); *G06F 9/455* (2013.01); *G06F 17/18* (2013.01); *G06N 3/04* (2013.01);
(Continued)

(58) Field of Classification Search
CPC .... G06F 21/53; G06F 2221/033; G06F 17/18; G06F 9/455; H04L 9/008; G06N 3/04; G06N 3/08
(Continued)

(56) References Cited

U.S. PATENT DOCUMENTS 5,708,714 A * 1/1998 Lopez .................. H04L 9/3255
713/180
6,772,339 B1 * 8/2004 Jakobsson ............. H04L 9/0841
380/283
(Continued)

FOREIGN PATENT DOCUMENTS

GB 2556981 A 6/2018
WO WO-2018174873 A1 9/2018

OTHER PUBLICATIONS

Ma, Xu, et al. "Privacy preserving multi-party computation delegation for deep learning in cloud computing." Information Sciences 459 (2018): 103-116. (Year: 2018).*
(Continued)

*Primary Examiner* — Syed A Zaidi
(74) *Attorney, Agent, or Firm* — Harness, Dickey & Pierce, P.L.C.

(57) ABSTRACT

A system and a method are provided for a parameter update. In an embodiment, the method includes obtaining, by a first entity, a function and parameter data from a second entity; selecting data samples provided by the first entities; providing a plurality of mutually isolated computing instances; assigning and providing the selected data samples to the computing instances; calculating, within each computing instance, results of the function; calculating averages over the results; determining whether the function fulfils a security criterion, and, if so: providing the calculated average for the gradient of the loss function and/or the calculated average of the output value and/or updated parameter data to the second entity.

21 Claims, 3 Drawing Sheets

(51) Int. Cl.
*G06F 17/18* (2006.01)
*G06N 3/04* (2006.01)
*G06N 3/08* (2006.01)
*H04L 9/00* (2006.01)

(52) U.S. Cl.
CPC ............... *G06N 3/08* (2013.01); *H04L 9/008* (2013.01); *G06F 2221/033* (2013.01)

(58) Field of Classification Search
USPC .......................................................... 726/22
See application file for complete search history.

(56) References Cited

U.S. PATENT DOCUMENTS

| | | | |
|---|---|---|---|
| 2011/0131222 A1* | 6/2011 | DiCrescenzo ...... | G06F 16/2465 707/757 |
| 2012/0213359 A1* | 8/2012 | Troncoso Pastoriza ..................... | H04L 9/008 380/28 |
| 2014/0121990 A1* | 5/2014 | Baldi ...... | G16B 30/00 702/20 |
| 2016/0378554 A1* | 12/2016 | Gummaraju ......... | G06F 9/5011 718/104 |
| 2017/0242961 A1* | 8/2017 | Shukla ..................... | G06F 21/53 |
| 2017/0372201 A1* | 12/2017 | Gupta ..................... | G06N 20/00 |
| 2018/0198602 A1* | 7/2018 | Duffy ....................... | G06F 40/20 |
| 2018/0218171 A1* | 8/2018 | Bellala ................... | G06N 20/00 |
| 2018/0219677 A1* | 8/2018 | Nair ...................... | H04L 9/0825 |
| 2018/0219842 A1* | 8/2018 | Bellala .................. | H04W 12/02 |
| 2019/0188402 A1 | 6/2019 | Wang et al. | |
| 2019/0311100 A1* | 10/2019 | Lindell .............. | G06K 9/00006 |
| 2019/0370334 A1* | 12/2019 | Bhowmick ............. | G06N 5/025 |
| 2020/0104705 A1* | 4/2020 | Bhowmick .......... | G06N 3/0445 |
| 2020/0177364 A1* | 6/2020 | Zhou ..................... | G06N 20/00 |
| 2020/0242466 A1* | 7/2020 | Mohassel ............ | G06F 21/6254 |

OTHER PUBLICATIONS

Von Maltitz, Marcel, et al. "A management framework for secure multiparty computation in dynamic environments." NOMS 2018-2018 IEEE/IFIP Network Operations and Management Symposium. IEEE, 2018. (Year: 2018).*
NPL Search Terms (Year: 2020).*
NPL Search Terms (Year: 2021).*
Yigzaw, Kassaye Yitbarek, et al. "Towards privacy-preserving computing on distributed electronic health record data." Proceedings of the 2013 Middleware Doctoral Symposium. 2013. (Year: 2013).*
Konecny, Jakub et al. "Federated Learning: Strategies for Improving Communication Efficiency", arXiv:1610.05492, 2017.
Abadi, Martin et al. "Deep Learning with Differential Privacy", arXiv:1607.00133, 2016.
Truex, Stacey et al. "A Hybrid Approach to Privacy-Preserving Federated Learning", IBM Research, arXiv:1812.03224, 2018.
Reza Shokri et al: "Privacy-Preserving Deep Learning"; Proceedings of the 22nd ACM SIGSAC Conference on Computer and Communications Security; CCS '15; pp:1310-1321; XP055549882; New York/ New York; USA; DOI: 10.1145/2810103.2813687; ISBN: 978-1-4503-3832-5; Abstract; Section 4 and 7.
Extended European Search Report for Application No./Patent No. 19187209.2-1213, dated Jan. 15, 2020.

* cited by examiner

SECURELY PERFORMING PARAMETER DATA UPDATES

PRIORITY STATEMENT

This application claims priority under 35 U.S.C. § 119 to European Patent Application number EP 19187209.2 filed on Jul. 19, 2019, the contents of which are herein incorporated by reference in their entirety.

FIELD

Embodiments of the invention generally relate to a computer-implemented method for securely performing a parameter data update, in particular machine learning parameter update steps, as well as to a system for securely performing a parameter data update, in particular machine learning parameter update steps.

BACKGROUND

In many applications, entities with the know-how to produce artificial intelligence entities such as trained artificial neural networks are different from entities that possess training data, that is data samples that can be used to train the artificial intelligence entity. In particular in the field of medical technology but also in many other applications, data security and data privacy are an important issue.

For example, in order to train artificial intelligence entities for performing medical tasks, usually highly sensitive patient data such as medical images, DNA data, medical history and so on are necessary. On the other hand, these are exactly the data that many regulations (such as the European General Data Protection Regulation, GDPR), laws and ethical considerations strive to keep private and secure.

SUMMARY

The inventors have discovered that sources of these data such as hospitals or research institutions which are skilled in keeping the data secure usually do not have the know-how in machine learning to provide a privacy preserving programming environment for machine learning, or to perform the machine learning themselves. Entities with the know-how in machine learning, such as computer research institutions, on the other hand should not have access to the original private data.

At least one embodiment of the present invention provides a method and a system for privacy preserving parameter data updates, in particular for machine learning, which can be performed without violating any constraints of the parties involved.

At least one embodiment of the present invention a method is provided for securely performing a parameter data update.

According to another embodiment of the present invention, a system for securely performing a parameter data update is provided.

According to another embodiment of the present invention, a non-transitory, computer-readable data storage medium is provided which comprises program code configured to, when executed (e.g. by a computer system), perform the method according to an embodiment of the present invention. The data storage medium may be a DVD, a CD-ROM, a solid state drive, a memory stick and/or the like.

According to another embodiment of the present invention, a data stream is provided which comprises, or is configured to generate, program code configured to, when executed (e.g. by a computer system), perform the method according to an embodiment of the present invention.

According to another embodiment of the present invention, a computer-implemented method for securely performing a parameter update is provided, comprising:
- obtaining, by at least one first entity or by an orchestrator entity different from the at least one first entity and from a second entity, a function and parameter data from the second entity, the function being expected to output an output value and a gradient of a loss function;
- selecting, by the at least one first entity or by the orchestrator entity, a plurality of data samples provided by the at least one first entity;
- providing a plurality of mutually isolated computing instances;
- assigning, by the at least one first entity or by the orchestrator entity, the data samples selected to the plurality of mutually isolated computing instances such that all of the data samples selected are assigned to isolated computing instances and such that at least one data sample is assign to each isolated computing instance of the plurality of mutually isolated computing instances;
- providing, by the at least one first entity, respective ones of the data samples to respective assigned ones of the isolated computing instances, along with the function and parameter data obtained;
- calculating, within each isolated computing instance of the plurality of mutually isolated computing instances, results of the function obtained based on the respective assigned at least one data sample;
- calculating, by the at least one first entity or by the orchestrator entity, averages, including an average for the output value and an average for a gradient of a loss function, over results calculated by all of the isolated computing instances;
- determining, by the at least one first entity or by the orchestrator entity, whether the function obtained fulfils at least one security criterion, and, upon the function obtained fulfilling at least one security criterion:
  - providing to the second entity, by the at least one first entity or the orchestrator entity, at least one of
    - the average calculated for at least one of the gradient of the loss function,
    - the average calculated of the output value and updated parameter data.

According to another embodiment of the present invention, a system for securely performing a parameter update is provided, comprising:
- at least one first entity with access to data samples, each at least one first entity being configured to provide at least one mutually isolated computing instance; and
- an orchestrator entity configured to:
- obtain a function and parameter data from a second entity;
- transmit the function and the parameter data obtained to the at least one first entity;
- select a plurality of the data samples;
- assign data samples selected, of the plurality of the data samples, to the at least one isolated computing instance such that all of the data samples selected are assigned to the at least one isolated computing instance and such that at least one data sample, of the plurality of the data samples, is provided to each isolated computing instance of the at least one isolated computing instance;

wherein the at least one first entity is further configured to provide the data samples, and the function and parameter data obtained, to a respectively assigned isolated computing instance;

wherein each respective provided isolated computing instances of the at least one isolated computing instance is configured to:

calculate, within each respective isolated computing instance provided, results of the function obtained based on the respectively provided at least one data sample; and wherein the orchestrator entity is further configured to:

calculate averages, including an average for an output value and an average for a gradient of a loss function over the results calculated by each respective isolated computing instance provided; and, upon determining that the function obtained fulfils at least one security criterion, provide to the second entity, at least one of the average for the gradient of the loss function calculated, the average of the output value calculated, and updated parameter data.

According to another embodiment of the present invention, a non-transitory computer program product is provided storing executable program instructions configured to, when executed, perform the method of an embodiment.

BRIEF DESCRIPTION OF THE DRAWINGS

The invention will be explained in yet greater detail with reference to exemplary embodiments depicted in the drawings as appended.

The accompanying drawings are included to provide a further understanding of the present invention and are incorporated in and constitute a part of the specification. The drawings illustrate the embodiments of the present invention and together with the description serve to illustrate the principles of the invention. Other embodiments of the present invention and many of the intended advantages of the present invention will be readily appreciated as they become better understood by reference to the following detailed description. Like reference numerals designate corresponding similar parts.

The numbering of method steps and their arrangement in the figures is intended to facilitate understanding and should not be construed, unless explicitly stated otherwise, or implicitly clear, to mean that the designated steps have to be performed according to the numbering of their reference signs. In particular, several or even all of the method steps may be performed simultaneously, in an over-lapping way or sequentially.

Although specific embodiments have been illustrated and described herein, it will be appreciated by those of ordinary skill in the art that the variety of alternate and/or equivalent implementations may be substituted for the specific embodiments shown and described without departing from the scope of the present invention. Generally, this application is intended to cover any adaptations or variations of the specific embodiments discussed herein.

DETAILED DESCRIPTION OF THE EXAMPLE EMBODIMENTS

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated. The present invention, however, may be embodied in many alternate forms and should not be construed as limited to only the example embodiments set forth herein.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Before discussing example embodiments in more detail, it is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments of the present invention. This invention may, however, be embodied in many alternate forms and should not be construed as limited to only the embodiments set forth herein.

Units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without subdividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Bluray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one embodiment of the invention relates to the non-transitory computer-readable storage medium including electronically readable control information (procesor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Accordingly, at least one embodiment is directed to a computer-implemented method for securely performing a parameter data update.

The parameter data may, for example, be provided as a parameter tensor such as a parameter matrix or a parameter vector or any other type of parameter array. In this way, the parameter data may be efficiently read in, processed and put out by computing systems and programming languages.

The data samples may, for example, be individual medical images or batches of medical images, electronic health records, EHR, bank statements, medical reports and/or any other type of data sample, in particular a type of data sample which is protected by a data privacy regulation and/or which comprises private data.

A plurality of mutually isolated computing instances may be understood to designate a number of computing instances which are unable to communicate with one another, at least during calculations, and which have the capability to calculate, using the parameter data, results of the obtained function, using the assigned data samples as input. In some instances, the isolated computing instances may also be unable to communicate with third parties, at least during any calculations. The isolated computing instances may also be designated as "black boxes".

Preferably, a computing instance can be easily generated, installed or instantiated and can similarly easily be wiped, i.e. destroyed, deconstructed and/or purged from any data that the computing instance was not produced or generated with. For example, providing a computing instance may comprise providing a personal computer, installing an operating system on it and optionally providing within the operating system a calculating environment, for example a specialized calculation tool or framework or a code library. Providing a computing instance may also comprise instantiating a virtualized calculating environment such as a virtual machine.

Conversely, wiping a computing instance may comprise de-instantiating a virtual machine, purging a hard drive of all data, overwriting a data storage once or repeatedly with random data and/or the like. Thus "wiping" shall be understood to encompass any method or procedure which is suitable for purging the computing instance of all data that have been added after the creation of the computing instance which may comprise destroying the computing instance entirely. Preferably, the individual isolated computing instances have no way of keeping or maintaining a state from one calculation to the next. In a preferred embodiment, wiping a computing instance may comprise, or consist of, restarting a computer program such that all temporary state information kept in random access memory, RAM, is lost. This may be easily achieved e.g. when a read-only device is mounted into a virtual machine.

Preferably, the computing instances are created equal, i.e. such that one cannot be distinguished from the other.

The number of data samples to be selected may be fixed (e.g. according to a request from the second entity) and may in particular be an integer multiple of the number of computing instances that can be provided by the at least one first entity. In this way, each of the computing instances can be provided with a batch of data samples. The assigning of the selected data samples may be performed in the manner of a true partition in the sense that each sample is assigned, and each sample is assigned only once. In other words, all of the instance batches of samples assigned to the different computing instances comprise different data samples, with no overlaps between different computing instances. However, other distribution types are also possible. In particular, the distribution of the selected data samples can be performed randomly and such that it is acceptable that one and the same data sample is assigned to more than one computing instance (i.e. is comprised in more than one instance batch).

The calculating of the averages may be performed by at least one of the at least one first entity, by an orchestrator entity that is different from the first and second entities or by a combination thereof. In case that each isolated computing instance is provided, according to the assigning (or: assignment), with more than one data sample, a preliminary average over these data samples may be calculated also by the corresponding computing instance itself.

In some advantageous embodiments, variants or refinements of embodiments, at least one of the at least one first entity determines whether the obtained function fulfils the at least one predefined security criterion. In case that it is determined that the function does not fulfil the at least one predefined security criterion, that is, in case in is determined that at least one predefined security criterion is not fulfilled, the at least one first entity may reject or refuse to calculate the function.

In this way, the at least one first entity which has the access to the data samples can in particular reject functions that seem to be constructed in such a way as to gain access to the underlying data samples, i.e. potentially malicious functions. The at least one first entity may, for examining (or: verifying) the obtained function employ stochastic methods, for example sampling the results the obtained function provides. Thus, it is possible that, if there is a plurality of first entities and each one performs the examination of the obtained function, a first entity that determines that the obtained function does not fulfil one of the at least one predefined security criterions notifies the other first entities so that, for example, they, too, may reject the obtained function.

The at least one security criterion may, in preferred embodiments, variants or refinements of embodiments, comprise at least one of the following:
- a criterion that the obtained function is deterministic;
- a criterion that the obtained function computes an output value as well as a gradient of a loss function; and/or
- a criterion that an output of the obtained function has a given dimensionality.

The rationale behind these criteria is the following: numerous methods are known to construct function such that, although only an average of the results of several functions will be provided, the results such that an untrustworthy recipient may reconstruct the underlying data samples. In a simple example, a function could be constructed such that with a chance of 1% it returns exactly its input (i.e. the received data sample), and with a chance of 99% returns a value of zero. This means that the returned average in most cases will be an underlying data sample divided by the number of distributed data samples. Over several iterations, the untrustworthy recipient can then reconstruct the underlying data samples. However, such a function is non-deterministic and would therefore violate one of the criteria outlined above.

Others of the outlined criteria perform checks that verify that the output of the obtained function is what it is supposed to be, i.e. an output value and gradient of a loss function for performing e.g. machine learning update steps and/or that the output has a given dimensionality, for example corresponding to the weights and biases of an artificial neural network to be trained. Using these criteria, the security of the method can be improved even if an untrustworthy or malicious second entity tries to gain access to the data samples.

It shall be understood that usually more than one iteration of calculating a gradient of the loss function and updating parameters is required for machine learning. Thus, it shall be understood that the steps of selecting data samples, providing the computing instances, assigning selected data samples, calculating results, and calculating averages (which may together be designated as "one iteration") be performed multiple times for the same obtained function.

Calculated averages for the gradient of the loss function and/or the calculated averages of the output value and/or updated parameter data may be provided after each iteration, after predefined number of iterations and/or at the end of all iterations. For example, 10,000 iterations may be performed and only at the end updated parameter data may be provided to the second entity. In this way, the second entity has even less clues as to the original data samples but is nevertheless provided with a functioning trained parameter data set.

The at least one first entity may receive from the second entity (possibly via the orchestrator entity) also calculation parameters specifying according to which parameters the calculations are to be performed. For example, the number of selected data sample for each iteration (number of selected data samples, total number of data samples, type of data samples such as CT images, PET images, MRI images and so on).

The output value may in particular be an output value of the same loss function for which also the gradient is calculated.

In some advantageous embodiments, variants or refinements of embodiments, an orchestrator entity is present which is different from the first and the second entity. The orchestrator entity can fulfil a variety of roles and may perform various of the steps of the method according to the first aspect of the invention.

For example, the orchestrator entity may obtain the function and the parameter data from the second entity before they are transmitted to the at least one first entity. The orchestrator entity may then determine whether the obtained function fulfils the at least one predefined security criterion (i.e. examine the function). This may be performed in addition or as an alternative to the option that the at least one first entity examines the obtained function. If the orchestrator entity finds that the obtained function does not fulfil at least one of the at least one predefined security criterion, the orchestrator may reject the obtained function parameter data, optionally without even informing the at least one first entity and/or without forwarding the function to the at least one first entity. In this way, the orchestrator entity may act as a filter for malicious or potentially harmful functions.

The orchestrator entity may also perform the selecting of the plurality of data samples provided by the at least one first entity, for example by transmitting, to the at least one first entity, identifier labels for all of the data samples and then instruct the at least one first entity to select specific ones of these identifier labels. As has been discussed in the foregoing, in one such step preferably as many data samples are selected which are, in the present iteration, to be calculated by the plurality of the mutually isolated computing instances.

The orchestrator entity may also perform the assigning of the selected data samples to the isolated computing instances, for example by simply transmitting the identifier labels to the at least one first entity which are to be provided, by the respective first entity, to a respective isolated computing instance.

Preferably, the plurality of mutually isolated computing instances is provided by the at least one first entity. Each of the at least one first entity may provide a single or more than one isolated computing instances. The first entities may be software agents installed on local computing systems, for example of hospitals, which are able and allowed to access the data samples provided by the hospitals and to provide the isolated computing instances.

The orchestrator entity may also calculate the averages over the results calculated for the obtained function by the isolated computing instances which may be received and collected by the orchestrator entity. If the orchestrator entity is configured to determine whether the obtained function fulfils the at least one predefined security criterion, this may be performed before the calculating of the averages or after the calculating of the averages. In any case, this determining is advantageously performed before any values or results are provided to the second entity. In particular, the orchestrator entity may be configured to decide not to provide e.g. the calculated averages to the second entity if at least one predefined security criterion is not fulfilled.

The orchestrator entity may be partially or completely implemented by a cloud computing system or a remote server system separate from computing systems on which the first entities are installed. The orchestrator entity may also partially or completely run on computer hardware on which also the first entities or at least some of the first entities are run.

In some advantageous embodiments, variants or refinements of embodiments, the method may further comprise the steps of providing the calculated averages (for example by the first entities) to the orchestrator entity, calculating, by the orchestrator entity, updated parameter data based on the calculated averages and providing, by the orchestrator entity, the updated parameter data to the second entity. In particular, the updated parameter data may be updated weights and/or biases for an artificial neural network, parameter data for a support vector machine and/or the like. The orchestrator entity may thus function as a trusted third party trusted by both the second entity and the first entity and may thus orchestrate the secure performance of the parameter update.

In some advantageous embodiments, variants or refinements of embodiments, the mutually isolated computing instances are containers in a virtualized environment which are prevented from communicating, in particular with one another, at least during the calculating of the result for the obtained function. This prevents potentially malicious or harmful obtained functions from communicating with one another during the calculation. This shuts down several possible attempts of access to the original data samples.

For example, when the isolated computing instances are individual workstations or PCs, a networking capability of each PC may be shut down after the assigned data samples have been provided to the computing instance and before the calculation starts, and may be reactivated after the calculation has finished. In other variants, the computing instances may not have any network capabilities at all: they may have only reading rights (no writing rights) for a first directory into which the assigned data samples are provided and may have only writing rights (no reading rights) for a second directory into which the calculated results are written. In this way, no instance of the obtained function is able to communicate with any other instance of the obtained function.

The obtained function is thus prevented from coordinating several of its instances to gain access to the original data samples.

In some advantageous embodiments, variants or refinements of embodiments, at least one isolated computing instance is controlled to calculate results of the obtained function for more than one selected data sample and is further controlled to calculate an average over set results. This reduces any efforts involved in creating in destroying isolated computing instances.

In some advantageous embodiments, variants or refinements of embodiments, whenever an isolated computing instance has finished calculating results for the at least one data sample assigned to it, it is examined (i.e. an examination is performed) whether a wiping criterion is fulfilled, and wherein, when said wiping criterion is found to be fulfilled, said isolated computing instance is wiped.

As has been described in the foregoing, wiping an isolated computing instance may comprise de-installing software, erasing all memory on a data storage medium, deconstructing a virtual machine or virtualized environment and/or the like.

The wiping criterion may, for example, involve a counter counting how many calculations have been performed by the current isolating computing instance. The criterion may be set such that after fixed number of calculations, the wiping criterion is fulfilled such that the computing instances are wiped always after fixed number of calculations.

The wiping criterion may also comprise determining a random integer number between two given threshold values (for example 1 and 10) and wiping the isolated computing instance whenever the counter has reached the random number, followed by determining a new random number for any following calculations.

The wiping criterion may also comprise determining a random number and wiping the isolated computing instance whenever said random number exceeds a predefined threshold (or, in a variant, is below a predefined threshold). This disrupts attempts to find out the underlying data sample from the results of each isolated computing instance, since because of the randomness involved it is not even clear how many calculations have been performed.

In some advantageous embodiments, variants or refinements of embodiments, in case of a plurality of first entities which do not trust one another and each of which generates at least one of the isolated computing instances, secure multiparty computation, SMPC, is used for calculating the averages over the results calculated by the isolated computing instances generated by different first entities. In this way, it can also be ensured that none of the first entities is able to gain access to the original data samples provided by other first entities.

In some advantageous embodiments, variants or refinements of embodiments, the method further comprises the steps of homomorphically encrypting, by the second entity, at least the function such that the isolated computing instances calculate the results using the homomorphically encrypted function, and homomorphically decrypting, by the second entity, the calculated average provided to the second entity. In this way, also the specific nature of the function provided by the second entity may be hidden from the at least one first entity so that also the first entities and/or the orchestrator entity do not gain any insight into the know-how of the second entity.

In some advantageous embodiments, variants or refinements of embodiments, a noise signal (or simply "noise") is added and/or gradient clipping is employed to individual results for the obtained function and/or to the calculated averages or the results before results or averages, respectively, are provided to the second entity. This further increases the difficulty for the second entity to reconstruct the original data samples.

In some advantageous embodiments, variants or refinements of embodiments, the parameter data comprise weights and/or biases for at least one artificial neural network. For training artificial networks, large quantities of data are necessary which are often under data protection laws or initiatives. In the described way, artificial neural networks may be trained without any sensitive or private data being leaked.

In some advantageous embodiments, variants or refinements of embodiments, the selecting of the plurality of data samples is performed randomly, for example by the orchestrator entity.

According to another embodiment of the present invention, a system for securely performing a parameter data update is provided.

According to another embodiment of the present invention, a non-transitory, computer-readable data storage medium is provided which comprises program code configured to, when executed (e.g. by a computer system), perform the method according to an embodiment of the present invention. The data storage medium may be a DVD, a CD-ROM, a solid state drive, a memory stick and/or the like.

According to another embodiment of the present invention, a data stream is provided which comprises, or is configured to generate, program code configured to, when executed (e.g. by a computer system), perform the method according to an embodiment of the present invention.

Figure 1:
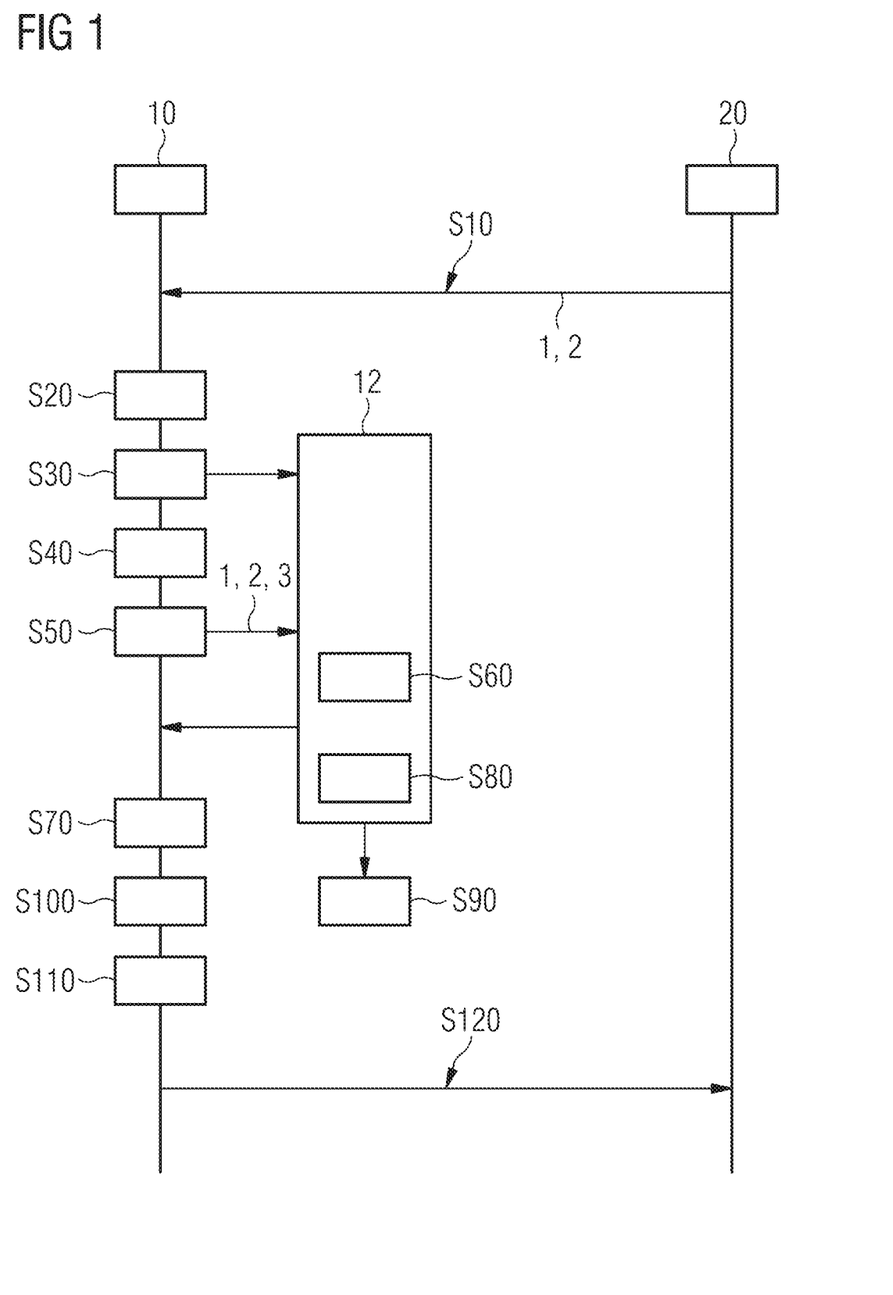
FIG. 1 shows a schematic diagram illustrating a method according to an embodiment of a first aspect of the present invention.

FIG. 1 shows a schematic diagram illustrating a method according to an embodiment of the first aspect of the present invention, i.e. a method for securely performing a parameter update, in particular machine learning update steps.

In a first step S10, a function 1 and parameter data 2 from a second entity 20 are obtained by the at least one first entity 10. In FIG. 1, for the sake of simplicity, only a single first entity 10 is shown. It shall be understood that the concepts and mechanisms described in the following and in the foregoing also apply to a plurality of first entities. For example, the function 1 may be a function designed to return function output value as well as a gradient of a loss function.

The function 1 is expected to output an output value as well as a gradient of a loss function. The term "expected" is used herein because at this step it is yet unverified whether this is indeed the case or whether the function 1 is a malicious or harmful function which imitates such output but does not actually provide it.

The at least one first entity 10 may be computing device such as a personal computer or a software agent running on a computer or a server. Similarly, the at least one second entity 20 may be computing device such as a personal computer or a software agent running on a computer or a server.

The second entity 20 may belong to a research institute that wishes to develop an artificial intelligence entity, in particular a machine learning entity which may be encapsulated within the function. For example, the function 1 may implement an artificial neural network, and the parameter data 2 may comprise, or consist of, weights and biases for said artificial neural network. In a first step, the parameter data 2 may contain random initializing values. Alternatively, the parameter data 2 may comprise, or consist of, pre-trained weights and biases.

In a step S20, a plurality of data samples provided by the at least one first entity 10 are selected. The plurality of selected data samples may be designated as a "mini batch" or simply as a "batch". The number of data samples selected, that is, the size of the batch, should be carefully chosen. On the one hand, the size of the batch should be large enough in absolute terms such that individual calculations cannot be easily reconstructed from the averages.

A degenerate case would be that the batch number is N1=1 (i=1 indicating here a first iteration), such that the averages over the whole batch would exactly correspond to the values for individual values of the function 1. On the other hand, the batch size Ni should be significantly smaller than the total number N of data samples that is available to the at least one first entity 10 such that a subset batch Ni (plurality of selected data samples) is sufficiently different each time. For example, for a total number of data samples of N=10,000, a batch size of Ni of 32 can be considered a reasonable choice. It leads to (10,000 chose 32)=about 3.6*1092 possible subsets. The higher this number is, the more secure the procedure is.

Another aspect is that the risk of leaking data decreases with a ratio of (dimension of an output of the computing instances)/(dimension of an input of the computing instances), since a fewer-dimensional output vector will generally be unable to comprise all of the information of a higher-dimensional input vector. Thus, larger output dimensions should also be accompanied by larger batch sizes Ni.

In the present example, the selecting S20 of the plurality of data samples may be performed by the at least one first entity 10. In other variants, an orchestrator entity may perform this task.

In a step S30, a plurality of mutually isolated computing instances 12 is provided, in the present example provided by the at least one first entity 10.

The mutually isolated computing instances 12 may be provided in any of the ways and with any of the features as has been described in the foregoing. In particular, the mutually isolated computing instances 12 may be containers in a virtualized environment which are prevented from communicating at least during the calculating of the result for the obtained function. The at least one first entity 10 may be configured to generate such virtualized environments and/or containers using the hardware on which also the at least one first instance 10 is run.

In a step S40, the selected data samples 3 are assigned to the isolated computing instances 12 such that all of the selected data samples 3 are assigned to isolated computing instances 12 and such that to each isolated computing instance 12 at least one selected data sample 3 is assigned. As has been described in the foregoing, this can be done in a variety of ways, for example such that the selected data samples are assigned in a true partition such that no data sample is assigned to more than one isolated computing instance 12.

Alternatively, this may be allowed in the sense that every selected data sample 3 has the same chance to be assigned to each of the isolated computing instances 12. Alternatively, the chance that a specific selected data sample 3 is assigned more than once may be set to decrease with each assignment of said specific data sample. In this way, it is still possible that the same data sample 3 is assigned multiple times but this becomes increasingly less probable.

In a step S50, the data samples 3 are provided to the respective isolated computing instance 12 to which they are assigned.

Either when the plurality of mutually isolated computing instances 12 is provided S30 or when the data samples 3 are provided S50 to the isolated computing instances 12 or even separately from these steps, the function 1 and the parameter data 2 are also provided to the isolated computing instances 12. In FIG. 1, this is exemplarily displayed as part of the providing S50 of the data samples 3 to the isolated computing instances 12.

In a step S60, within and by each isolated computing instance 12, results of the obtained function 1, preferably also based on the parameter data 2, are calculated based on the at least one data sample 3 assigned to the respective isolated computing instance 12. Again, for example in the case of an artificial neural network, each isolated computing instance 12 may calculate an output of the artificial neural network implemented by the function 1, using the provided parameter data 2 for its weights and biases.

As has been described in the foregoing, in case the isolated computing instance 12 is provided with more than one data sample 3, it may be configured to calculate results for all of the data samples 3 assigned to it and to also calculate averages for the output value and for the gradient of the loss function of the results it has calculated.

In a step S70, averages, comprising an average for the output value and an average for the gradient of loss function over the results calculated by all of the isolated computing instances 12 are calculated, for example by the at least one first entity 10.

Optionally, after the calculating S60 is finished, each isolated computing instance 12 may, in a step S80, examine whether a wiping criterion is fulfilled and, when said wiping criterion is found to be fulfilled, the isolated computing instance is wiped in a step S90. If the isolated computing instance 12 is not wiped, it may be provided again in a further iteration. If it is wiped S90, for any possible further iteration, a new isolated computing instance 12 is generated to be provided instead S30.

In a step S100, it is determined whether the obtained function 1 fulfills at least one predefined security criterion. Step S100 may be performed at any time, such as immediately after obtaining the function 1 so as to potentially stop any further actions of the method when at least one of the predefined security criterion has been found to be not fulfilled. In this way, no resources are lost on a function 1 that is not considered to be sufficiently secure. In the example shown in FIG. 1, the determining S100 is performed after the averages are calculated S70 and before any data based on any calculations is provided to the second entity 20.

In an optional step S110, noise (or: a noise signal) is added to the calculated S70 averages and/or gradient clipping is employed. In addition or alternatively, noise and/or gradient clipping may already be employed on individual results of the isolated computing instances 12 before the averages are calculated S70, optionally even by the isolated computing instances 12 themselves.

In a step S120, under the condition that the obtained function 1 has been determined S100 to fulfil the at least one predefined security criterion, the calculated average for the gradient of the loss function and/or the calculated average of the output value and/or updated parameter data are provided to the second entity 20.

In the foregoing, a single iteration i, that is, a single computation of results for a single batch Ni of selected data samples has been described. However, preferably more than one iteration is performed. Thus, the calculated S70 averages for the gradient of the loss function can be used, for example by the at least one first entity, to calculate an updated parameter set, in particular by changing the previously used parameter data by moving the parameters along the gradient vector indicated by the calculated average for the gradient of the loss function.

Then, the next iteration may be performed in the same way as described before, simply using the updated parameter instead of the originally obtained parameter data 2. Thus, in step S20 again a plurality of data samples may be selected and the method may continue as has been described, for example until a desired number of iterations has been performed. The second entity 20 may communicate the number of desired iterations to the at least one first entity 10. Preferably, the step of determining whether the obtained function 1 fulfils the at least one predefined security criterion is in such cases performed before the first iteration i=1 is made so that no computing resources are wasted. Moreover, in case that in the optional step S110 noise and/or gradient clipping is applied, this is preferably done after the last iteration has been calculated so as not to interfere with the actual calculations.

The provided method according to FIG. 1 may thus also be designated as a function for performing at least one parameter data update, as a function for providing a plurality of parameter data updates, or as a function for providing machine learning parameter updates. In another sense, as the providing of updated machine learning parameter updates is a kind of training, the method may also be designated as a method for training an artificial intelligence entity, in particular an artificial neural network. The method may comprise the step of deploying the artificial neural network indicated by the obtained function using the updated parameter data, preferably the updated parameter data from the last iteration. For example, any or all of the at least one first entity 10 may deploy the artificial intelligence entity thus trained.

Figure 2:
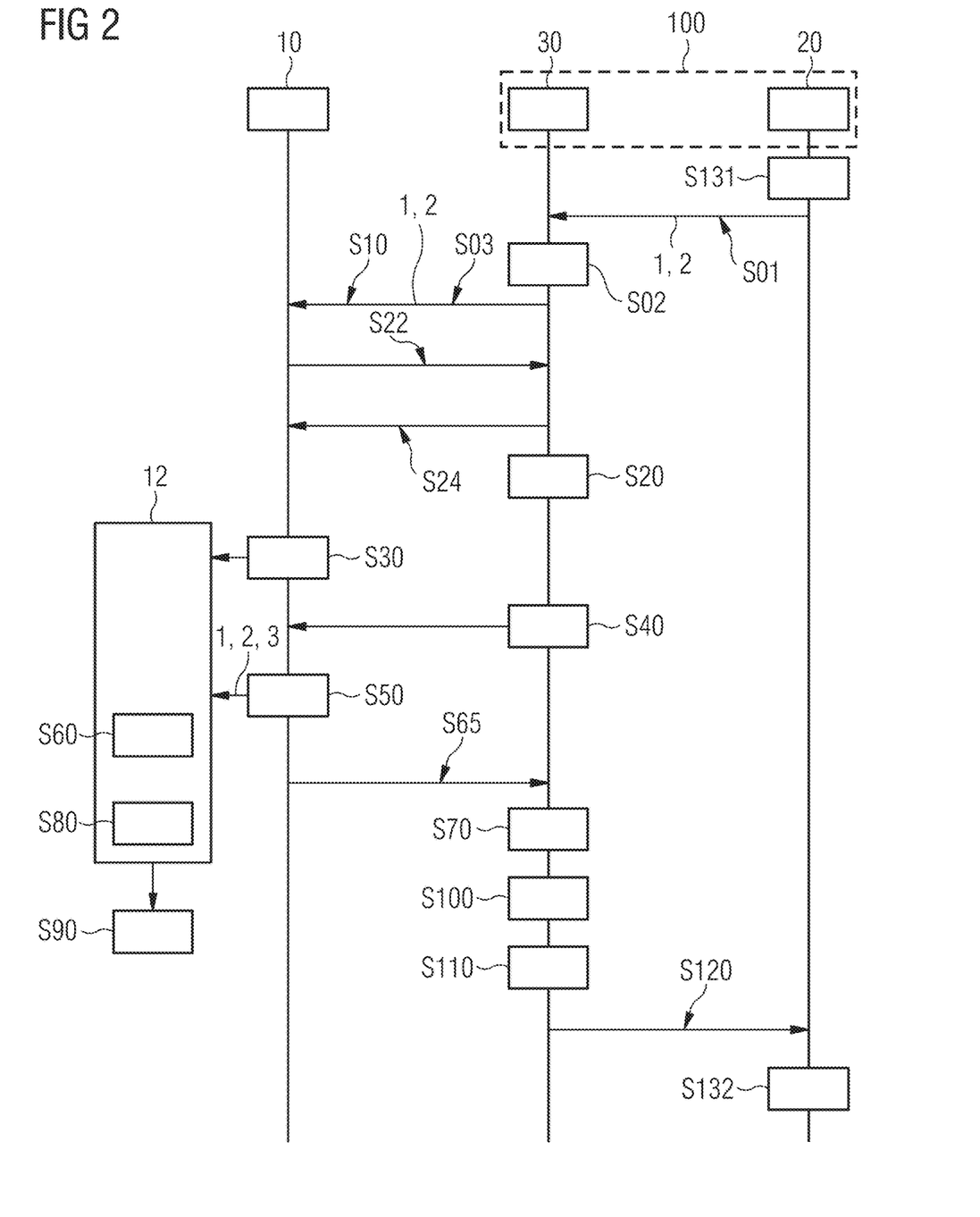
FIG. 2 schematically illustrates another embodiment of the method according to the first aspect of the present invention as well as an embodiment of a system according to an embodiment of the second aspect of the present invention.

FIG. 2 schematically illustrates another embodiment of the method according to the first aspect of the present invention as well as an embodiment of entity system 100 according to an embodiment of the second aspect of the present invention.

The method according to FIG. 2 is in general similar than the one as described with respect to FIG. 1, with the difference that in the method according to FIG. 2 an orchestrator entity 30 is present. The orchestrator entity 30 may in particular be an application or program run on a cloud computing system or a server remote from machines on which the first entities 10 and the second entities 20 are run or implemented. The system comprises the orchestrator entity 30 and at least one of the at least one first entities 10.

In a step S01, the function 1 and parameter data 2 from the second entity 20 may be obtained by the orchestrator entity 30. In a step S02, the orchestrator entity 30 may determine whether the obtained function 1 fulfils the at least one predefined security criterion, for example as has been described with respect to step S100 in the context of FIG. 1. The advantage here is that this examination is performed before any of the first entities 10 are involved, that is one more step removed from the repository of the sensitive/private data samples to which the first entities 10 only have access.

If it is determined that the obtained function 1 fulfills said at least one security criterion, in a step S03 the function 1 and the parameter data 2 are transmitted by the orchestrator entity 30 to the at least one first entity 10, which coincides with the step S10 of obtaining, by the at least one first entity 10, the function 1 and the parameter data 2. If it is determined that at least one security criterion is not fulfilled by said obtained function 1, the function 1 is rejected by the orchestrator entity 30. Thus, if the at least one first entity 10 trust the orchestrator entity 30, the orchestrator entity 30 may protect the at least one first entity 10.

The selecting S30 of the plurality of data samples provided by the at least one first entity 10 may also be performed by the orchestrator entity 30. In order to do this, the orchestrator entity 30 may previously receive, in an optional step S22, information by the at least one first entity 10 about the number and/or type of available data sets 3. In some embodiments, the orchestrator entity 30 provides, in a step S24, identifier labels to the at least one first entity 10 with which the data samples 3 are identified. For the selecting S30, the orchestrator entity then only has to determine, for example randomly, a suitable number of identifier labels.

The isolated computing instances 12 may be provided, or generated, by the at least one first entity 10 as has been described in the foregoing.

The assigning S40 of the selected data samples 3 to the isolated computing instances 12 may be performed by the orchestrator entity 30, for example by transmitting to the at least one first entity 10 identifier labels indicating which data samples that shall be provided to which isolated computing instance 12.

For example, the orchestrator entity 30 may inform one particular first entity 10 that it shall generate two isolated computing instances 12, and provide data samples with identifier labels 1, 2 and 7 to the first of these isolated computing instances 12 and to provide data samples with identifier labels 9, 10 and 11 to the second of those isolated computing instances 12. Based on the assigning S40, the at least one first entity 10 may then provide S50 the data samples 3 to the respective isolated computing instance 12 to which they are assigned. Again in this step also the function 1 and the parameter data 2 may be transmitted to the isolated computing instances 12, if this has not been already performed in step S30. In some variants, the orchestrator entity 30 may also receive the selected data samples from the at least one first entity 10 and provide them to the isolated computing instances 12.

Steps S60, S80 and S90 may be performed as has been described in the foregoing. The calculating S70 of the averages can in the embodiment according to FIG. 2 be performed by the orchestrator entity 30. For that, the individual results of the isolated computing instances 12 may be provided, directly or preferably via the at least one first entity 10, to the orchestrator entity 30. Individual results of the isolated computing instances 12 in this sense may be results computed for a single data sample or results computed for one or more data samples over which already the isolated computing instance has performed an averaging. Thus, the individual results may be transmitted by the at least one first entity 10 (or alternatively by the computing instances 12 directly) to the orchestrator entity 30.

The steps S100 and S110 may then also be performed by the orchestrator entity 30. In this way, even in case of distrust between a plurality of first entities 10, maximum security is achieved in that only the orchestrator entity 30 has access to anything more detailed than the average over all of the results. The calculation can also be done in such a way that the orchestrator does not have access to the data that are being exchanged, for example by employing secure multi-party computation, SMPC.

Again, preferably, more than one iteration i=1, 2, . . . is performed. Since in the method of FIG. 2 it is the orchestrator entity 30 which provides S03 the parameter set 2 to the at least one first entity 10, it is advantageous when it is also the orchestrator entity 30 which calculates the updated parameter data based on the calculated average for the gradient of the loss function. Then, preferably it is also the orchestrator entity 30 which provides the updated parameter data to the at least one first entity 10 for the performing of the next iteration.

The orchestrator entity 30 may count the number of iterations i and may, for maximum security, only after the last iteration, provide S120 any data to the second entity 20. For maximum security, only the final updated parameter data may be provided S120 to the second entity 20. Depending on the arrangement between first entity 10, second entity 20 and orchestrator entity 30, also additional data such as the overall average for the gradient of the loss function and/or the overall calculated average of the output value may be provided S120 to the second entity 20.

During the determining S100 whether the obtained function 1 fulfils the at least one predefined security criterion, the orchestrator entity 30 can for example examine statistics over the individual results transmitted S65 to the orchestrator entity 30 and, if need be, prevent suspicious computation or stop the performing of the method all together. The orchestrator entity 30 may also empirically test properties about the obtained function 1, preferably immediately after obtaining S01 the function 1. The orchestrator entity 30 can, for instance, selectively replay some invocations of the function 1 to test for determinism with high probability. Since the invocations of the obtained function 1 can be performed in an isolated manner and may not keep their state they cannot detect whether they have been invoked with the same parameters multiple times. This is preferably performed by the orchestrator entity 30 instructing the at least one first entity 10 to provide corresponding mutually isolated computing instances 12 for the sake of the replay.

Similarly, the orchestrator entity 30 can check whether the individual results transmitted S65 to it really contain an output value (in particular a loss value) and a corresponding gradient with respect to one of the inputs. By using a small step size beta, moving the parameter data about beta in the negative supposed gradient direction should lead to a decrease in the loss value of the individual results. Sampling can be performed to get a high probability estimate of whether the supposed gradient part of the obtained function 1 is actually gradient-like according to this criterion.

For both of the methods described with FIG. 1 and FIG. 2, secure multiparty computation SMPC can be employed whenever two or more of the first entities communicate with one another, in particular when the first entities 10 do not trust one another. Similarly, in both embodiments, homomorphic encryption can be employed.

In FIG. 2, there is an optional step S131 which can be performed by the second entity 20 which comprises homomorphically encrypting the parameter data 2 which are then transmitted to, and obtained S01 by, the orchestrator entity 30.

Thus, after data has been provided S120 to the second entity 20, an optional step S132 of homomorphically decrypting said results can be performed such that the second entity 20 eventually is provided with clear unencrypted results. This method may be equally applied for the embodiment of FIG. 1.

Figure 3:
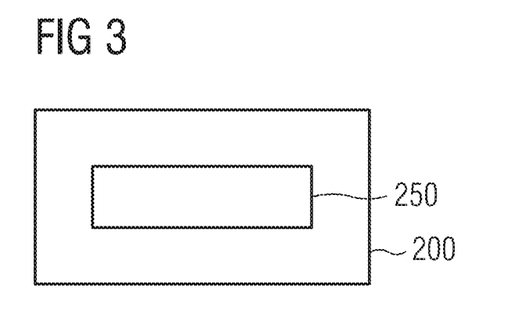
FIG. 3 shows a schematic block diagram illustrating a computer program product according to an embodiment of the third aspect of the present invention.

FIG. 3 shows a schematic block diagram illustrating a computer program product 200 according to an embodiment of the third aspect of the present invention. The computer program product 200 comprises executable program instructions 250 configured to, when executed, perform the method according to an embodiment of the first aspect, in particular the method of FIG. 1 or FIG. 2 or according to any of the modifications and variations thereof described herein.

Figure 4:
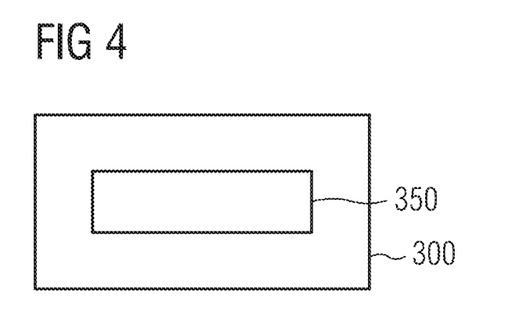
FIG. 4 shows a schematic block diagram illustrating a data storage medium according to an embodiment of the fourth aspect of the present invention.

FIG. 4 shows a schematic block diagram illustrating a data storage medium 300 according to an embodiment of the fourth aspect of the present invention. The data storage medium 300 comprises executable program instructions 350 configured to, when executed, perform the method according to an embodiment of the first aspect, in particular the method of FIG. 1 or FIG. 2 or according to any of the modifications and variations thereof described herein.

In the foregoing detailed description, various features are grouped together in the examples with the purpose of streamlining the disclosure. It is to be understood that the above description is intended to be illustrative and not restrictive. It is intended to cover all alternatives, modifications and equivalence. Many other examples will be apparent to one skilled in the art upon reviewing the above specification, taking into account the various variations, modifications and options as described or suggested in the foregoing.

The patent claims of the application are formulation proposals without prejudice for obtaining more extensive patent protection. The applicant reserves the right to claim even further combinations of features previously disclosed only in the description and/or drawings.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for."

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A computer-implemented method for securely performing a parameter update, comprising:
obtaining, from a second entity by at least one first entity or by an orchestrator entity different from the at least one first entity and from the second entity, a function and parameter data, the function outputting an output value and a gradient of a loss function;

selecting, by the at least one first entity or by the orchestrator entity, a plurality of data samples provided by the at least one first entity;

providing a plurality of mutually isolated computing instances;

assigning, by the at least one first entity or by the orchestrator entity, the plurality of data samples selected to the plurality of mutually isolated computing instances such that all of the plurality of data samples selected are assigned to ones of the plurality of mutually isolated computing instances and such that at least one data sample of the plurality of data samples is assigned to each isolated computing instance of the plurality of mutually isolated computing instances;

providing, by the at least one first entity to respective assigned ones of the isolated computing instances, the function, the parameter data obtained, and respective ones of the plurality of data samples;

calculating, within each isolated computing instance of the plurality of mutually isolated computing instances, results of the function obtained based on the respective assigned at least one data sample of the plurality of data samples;

calculating, by the at least one first entity or by the orchestrator entity, averages based on the results of all of the isolated computing instances, the averages including an average of the output value and an average of the gradient of the loss function;

determining, by the at least one first entity or by the orchestrator entity, whether the function obtained satisfies at least one security criterion; and in response to the function obtained satisfying at least one security criterion, providing to the second entity, by the at least one first entity or the orchestrator entity, at least one of (a) the average calculated for at least one of the gradient of the loss function, (b) the average calculated of the output value and (c) updated parameter data.

2. The method of claim 1, wherein the at least one security criterion comprises at least one of:
a criterion that the function obtained is deterministic;
a criterion that the function obtained computes a function value and a gradient of a loss function; and
a criterion that an output of the function obtained includes a given dimensionality.

3. The method of claim 2, wherein at least one of the at least one first entity determines whether the function obtained satisfied the at least one security criterion.

4. The method of claim 2, wherein at least the orchestrator entity, different from the first and the second entity, determines whether the function obtained satisfied the at least one security criterion.

5. The method of claim 4, further comprising:
providing the averages calculated to the orchestrator entity;
calculating, by the orchestrator entity, updated parameter data based on the averages calculated; and
providing, by the orchestrator entity, the updated parameter data to the second entity.

6. The method of claim 2, wherein the mutually isolated computing instances are containers in a virtualized environment, the containers prevented from communicating at least during the calculating of the result for the function obtained.

7. The method of claim 2, wherein at least one isolated computing instance is controlled to calculate results of the function obtained for more than one selected date sample and is further controlled to calculate an average over the results.

8. The method of claim 1, wherein at least one of the at least one first entity determines whether the function obtained satisfies the at least one security criterion.

9. The method of claim 1, wherein at least the orchestrator entity, different from the first and the second entity, determines whether the function obtained satisfies the at least one security criterion.

10. The method of claim 9, further comprising:
providing the averages calculated to the orchestrator entity;
calculating, by the orchestrator entity, updated parameter data based on the averages calculated; and
providing, by the orchestrator entity, the updated parameter data to the second entity.

11. The method of claim 1, wherein the mutually isolated computing instances are containers in a virtualized environment, the containers prevented from communicating at least during the calculating of the result for the function obtained.

12. The method of claim 1, further comprising:
controlling the at least one isolated computing instance to calculate results of the function obtained for more than one selected date sample; and
controlling the at least one isolated computing instance to calculate an average over the results.

13. The method of claim 1, wherein, in response to an isolated computing instance among the at least one isolated computing instance finishing calculating results for the at least one data sample respectively assigned to the isolated computing instance, further comprising:
examining the isolated computing instance to determine whether or not a wiping criterion is satisfied, and
in response to the wiping criterion being found to be satisfied, wiping the isolated computing instance.

14. The method of claim 1, wherein in response to a plurality of first entities, which do not trust one another and each of which generates at least one of the isolated computing instances, secure multi-party computation (SMPC) is used for calculating the averages at least over the results calculated by the isolated computing instances generated by different first entities.

15. The method of claim 1, further comprising:
homomorphically encrypting, by the second entity, at least the function such that the at least one isolated computing instances calculate the results using the homomorphically encrypted function; and
homomorphically decrypting, by the second entity, the average calculated and provided to the second entity.

16. The method of claim 1, before providing results or averages to the second entity, further comprising:
adding a noise and employing a gradient clipping, the addition of noise and the employing the gradient clipping being at least one of (a) to individual results for at least one of the function obtained and (b) to the averages calculated over the results.

17. The method of claim 1, wherein the parameter data includes at least one of weights and biases, the at least one of weights and biases for at least one artificial neural network.

18. The method of claim 1, wherein the selecting of the plurality of data samples is performed randomly.

19. The method of claim 1, wherein the providing to the second entity, by the at least one first entity or the orchestrator entity, at least one of the average calculated for at least one of the gradient of the loss function, the average calculated of the output value and updated parameter data includes, providing, to the second entity by the at least one first entity or the orchestrator entity, the gradient of the loss function.

20. A system for securely performing a parameter update, comprising:
- at least one first entity processor with access to data samples, each at least one first entity processor being configured to provide at least one mutually isolated computing instance; and
- an orchestrator entity processor configured to cause the system to,
    - obtain, from a second entity, a function and parameter data,
    - transmit, to the at least one first entity processor, the function and the parameter data obtained,
    - select a plurality of the data samples, and
    - assign at least one of the plurality of data samples selected to the at least one mutually isolated computing instance such that all of the plurality of data samples selected are assigned to at least one of the mutually isolated computing instances and such that at least one data sample of the plurality of the data samples is assigned to each isolated computing instance of the at least one mutually isolated computing instance,
- wherein the at least one first entity processor is further configured to provide at least one of the plurality of data samples, the function, and parameter data obtained to a respectively assigned isolated computing instance,
- each respectively provided mutually isolated computing instance of the at least one mutually isolated computing instance is configured to calculate results of the function obtained based on the respectively provided at least one data sample of the plurality of data samples,
- the orchestrator entity processor is further configured to calculate averages based on the results of all of the mutually isolated computing instances, the averages including an average of an output value of the function and an average of a gradient of a loss function, and
- in response to determining that the function obtained satisfied at least one security criterion, provide to the second entity at least one of (a) the average of the gradient of the loss function calculated, (b) the average of the output value calculated, and (c) updated parameter data.

21. A non-transitory computer program product storing executable program instructions configured to, when executed, perform a method comprising:
- obtaining, from a second entity by at least one first entity or by an orchestrator entity different from the at least one first entity and from the at least one second entity, a function and parameter data, the function outputting an output value and a gradient of a loss function;
- selecting, by the at least one first entity or by the orchestrator entity, a plurality of data samples provided by the at least one first entity;
- providing a plurality of mutually isolated computing instances;
- assigning, by the at least one first entity or by the orchestrator entity, the plurality of data samples selected to the plurality of mutually isolated computing instances such that all of the plurality of data samples selected are assigned to ones of the plurality of mutually isolated computing instances and such that at least one data sample of the plurality of data samples is assigned to each isolated computing instance of the plurality of mutually isolated computing instances;
- providing, by the at least one first entity to respective assigned ones of the isolated computing instances, the function, the parameter data obtained, and respective ones of the plurality of data samples;
- calculating, within each isolated computing instance of the plurality of mutually isolated computing instances, results of the function obtained based on the respective assigned at least one data sample of the plurality of data samples;
- calculating, by the at least one first entity or by the orchestrator entity, averages based on the results of all of the isolated computing instances, the averages including an average of the output value and an average of the gradient of the loss function;
- determining, by the at least one first entity or by the orchestrator entity, whether the function obtained satisfies at least one security criterion; and
- in response to the function obtained satisfying at least one security criterion, providing to the second entity, by the at least one first entity or the orchestrator entity, at least one of (a) the average calculated for at least one of the gradient of the loss function, (b) the average calculated of the output value and (c) updated parameter data.

* * * * *